US009265977B2

(12) United States Patent
Toeckes et al.

(10) Patent No.: US 9,265,977 B2
(45) Date of Patent: Feb. 23, 2016

(54) MULTI-DUMP METERING VALVE

(76) Inventors: Mark Toeckes, Delta (CA); Earl D. Trautman, Delta (CA)

( * ) Notice: Subject to any disclaimer, the term of this patent is extended or adjusted under 35 U.S.C. 154(b) by 708 days.

(21) Appl. No.: 13/411,296

(22) Filed: Mar. 2, 2012

(65) Prior Publication Data
US 2012/0222874 A1   Sep. 6, 2012

Related U.S. Application Data

(60) Provisional application No. 61/449,371, filed on Mar. 4, 2011.

(51) Int. Cl.
| | | |
|---|---|---|
| *A62C 3/02* | (2006.01) | |
| *A62C 31/28* | (2006.01) | |
| *A62C 3/08* | (2006.01) | |
| *A62C 8/02* | (2006.01) | |

(52) U.S. Cl.
CPC ............. *A62C 3/0235* (2013.01); *A62C 3/0228* (2013.01); *A62C 3/08* (2013.01); *A62C 31/28* (2013.01); *A62C 8/02* (2013.01)

(58) Field of Classification Search
CPC ..... A62C 3/0228; A62C 3/0235; A62C 31/28
USPC ................. 169/18, 30, 34, 51, 52, 53, 54, 70
See application file for complete search history.

(56) References Cited

U.S. PATENT DOCUMENTS

| | | | | |
|---|---|---|---|---|
| 5,829,809 A * | 11/1998 | Arney et al. | ................ | 294/68.21 |
| 6,192,990 B1 * | 2/2001 | Brooke | ........................... | 169/53 |
| 6,889,776 B2 * | 5/2005 | Cheung | ........................... | 169/53 |
| 7,182,145 B2 * | 2/2007 | Powers et al. | ................... | 169/53 |
| 7,708,082 B2 * | 5/2010 | Hall et al. | ....................... | 169/53 |

* cited by examiner

*Primary Examiner* — Ryan Reis

(57) ABSTRACT

Valves having an inner assembly comprising: a base plate spaced apart from a top plate to define therebetween an open side, the base plate defining an outlet; an outer assembly comprising solid side walls and being movable relative to the inner assembly between open and closed positions, an upper portion of the solid side walls seal with the top plate only when the outer assembly is in the closed position, a lower portion of the solid side walls seal with the base plate only when the outer assembly is in the closed position, wherein the open position allows flow through the valve via the open side portion and the outlet of the outer assembly; and an actuator mounted to the inner assembly and connected to the outer assembly to move the outer assembly between the open and closed positions in response to electrical control signals.

7 Claims, 7 Drawing Sheets

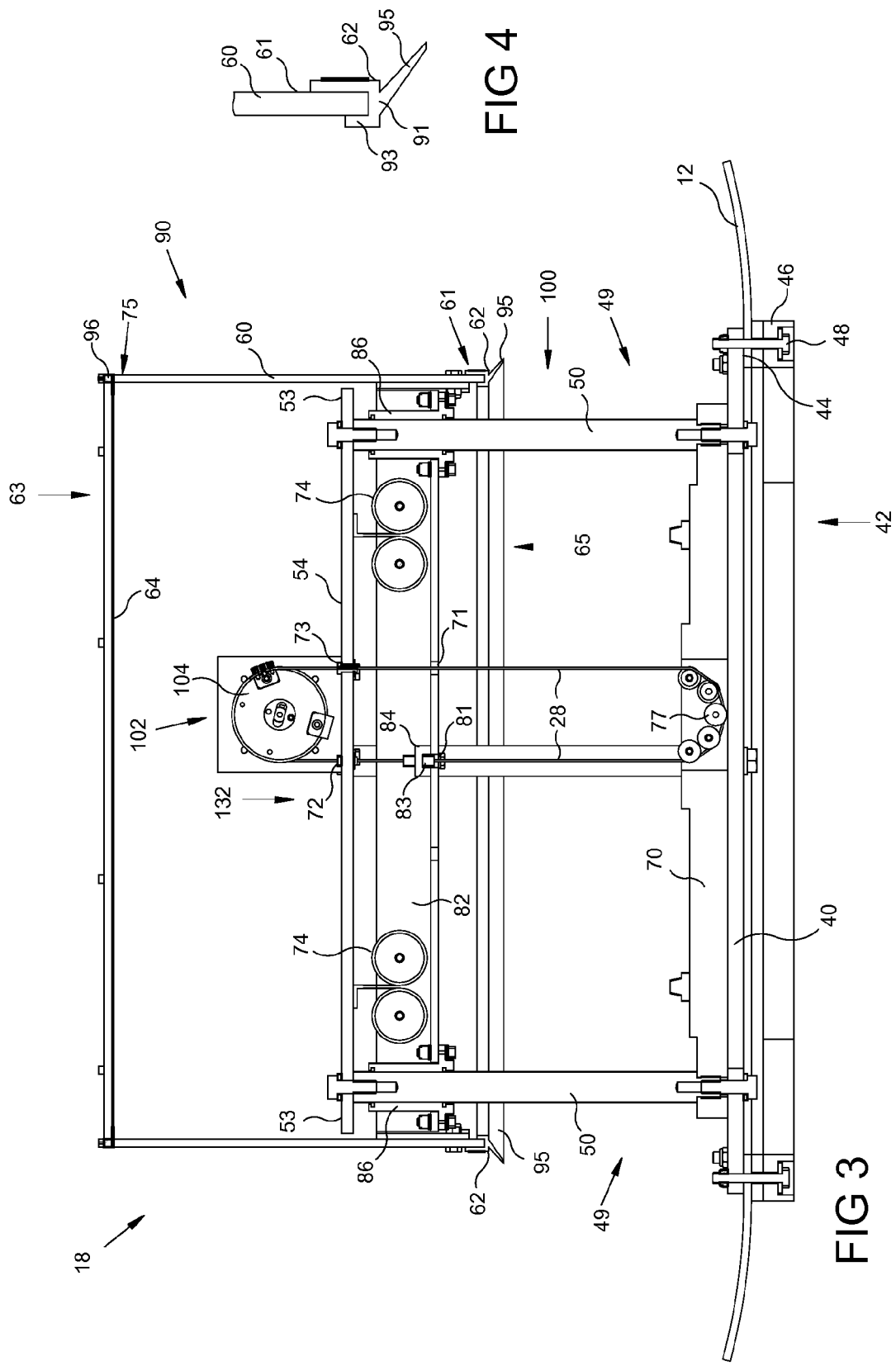

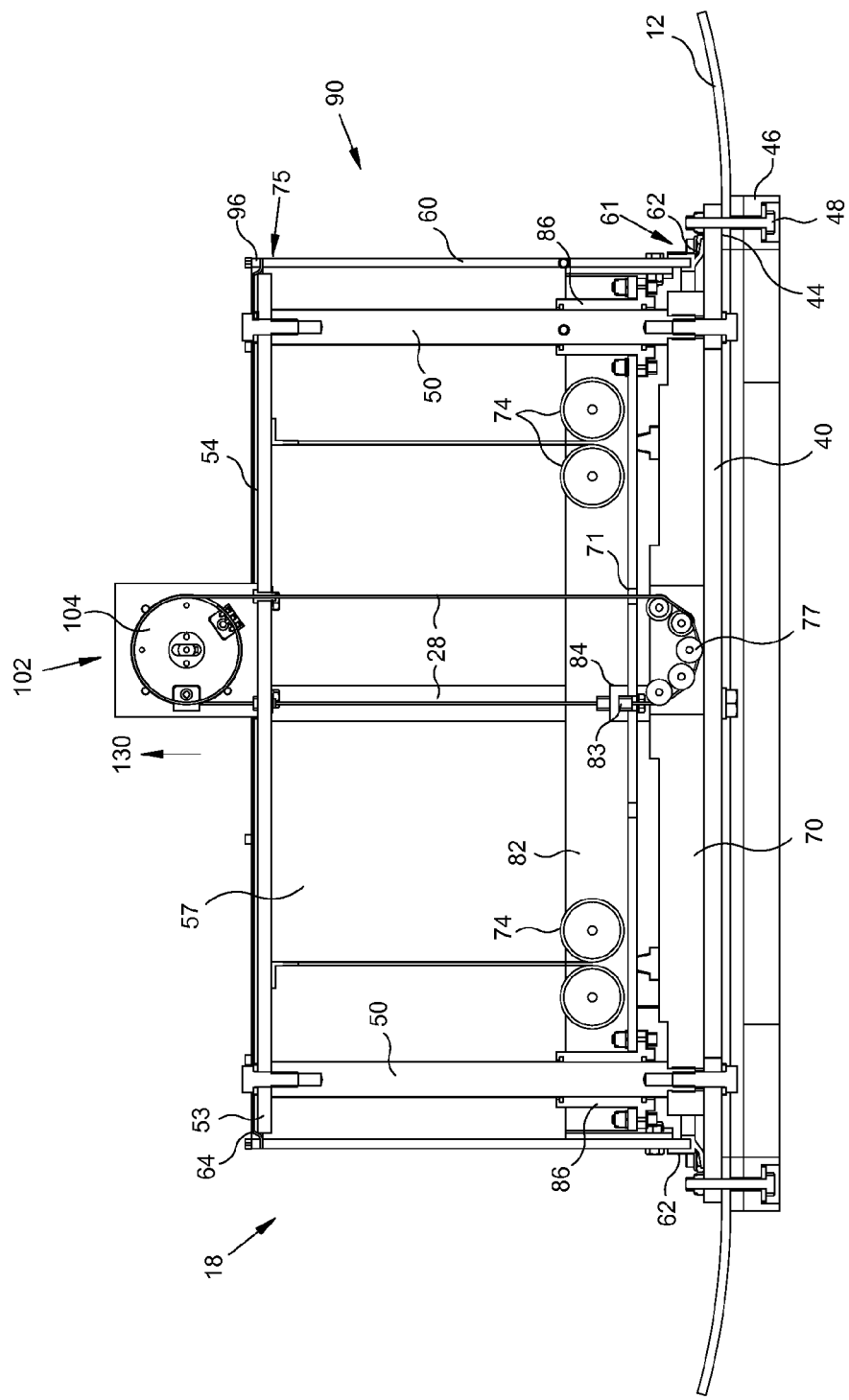

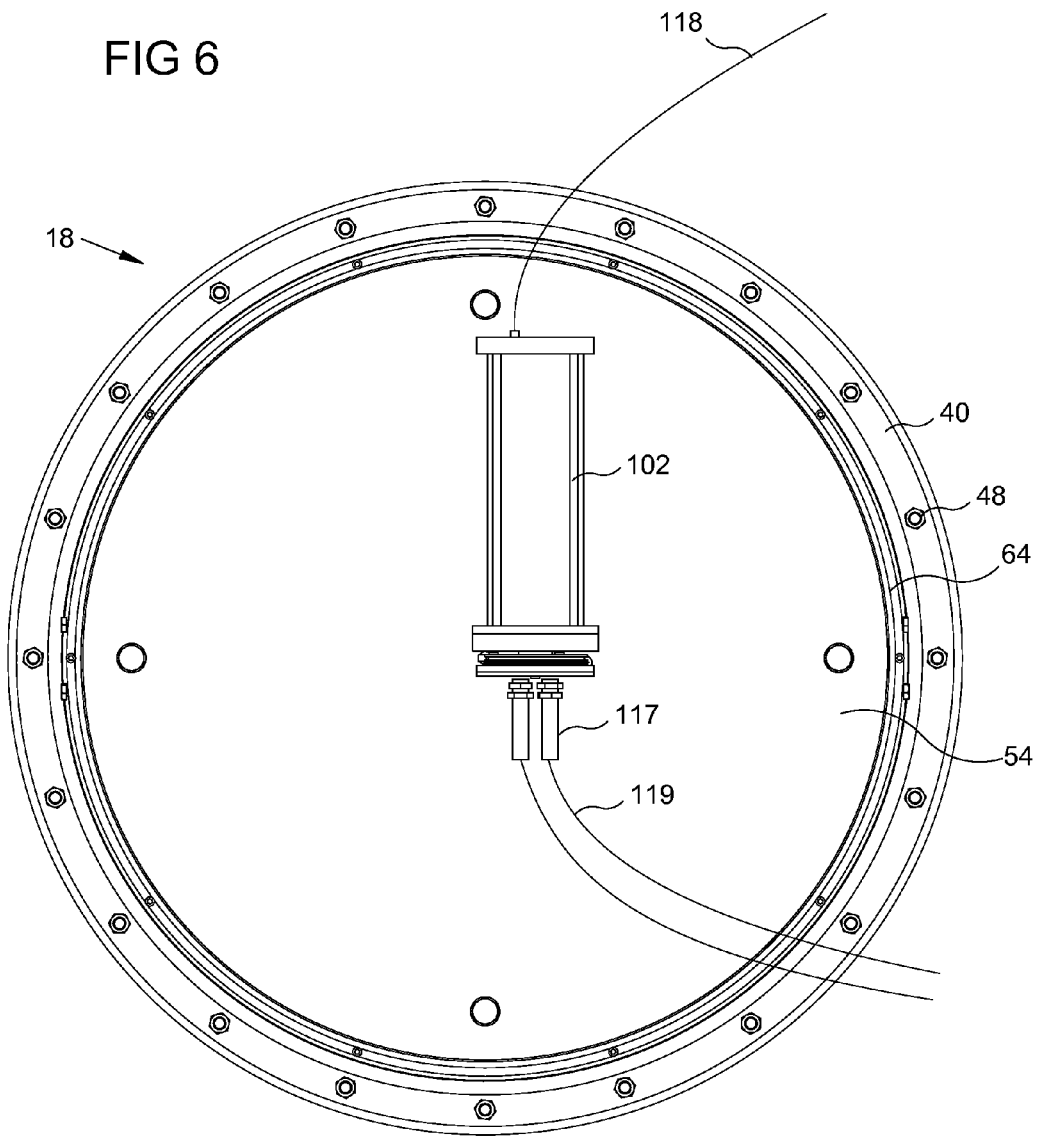

MULTI-DUMP METERING VALVE

FIELD OF THE INVENTION

The invention pertains to mechanical valves, in particular to mechanical valves that may be used to regulate fluid flow from reservoirs such as aerial firefighting buckets.

BACKGROUND

Helicopter carried dump-buckets are well known for use in fighting forest fires. These buckets, at their simplest, may comprise a rigid or flexible reservoir or body for holding a volume of water, a sling to suspend the reservoir from a helicopter, a valve, and an actuator which is controlled from inside the helicopter to operate the valve to release the water from the reservoir over the fire.

In some prior art buckets, the valve may consist of a simple flapper valve located on a bottom interior surface of the reservoir and operated by a remotely controlled actuator, for example. A flapper valve typically includes a base plate having an outlet therein, a flat flapper member disposed over-top of the base plate so as to block the outlet, and a hinge connected between an edge of the flapper member and the base plate to hingeably connect the flapper member to the base plate permitting the flapper member to alternately block and expose the outlet.

In other prior art buckets, the valve may consist of a butterfly valve, which typically includes a longitudinally extending axle having first and second coplanar plates extending laterally therefrom. The butterfly valve may be connected to a bottom portion of the bucket and located in an opening therein. When closed, the first plate may seal against an interior surface of the bucket while the second plate may seal against an exterior surface of the bucket. The valve may be opened by rotating the first and second plates about the axle and may be fully opened by rotating the plates to a position perpendicular to their closed position.

There are problems associated with each of these valves. With the flapper vales, there are significant forces imparted to the valve by a full head of water that tend to resist the hinging of the flapper member and thereby resists the opening of the flapper valve, which requires a powerful motor to actuate the flapper, resulting in increased weight and power consumption. High electrical power demands in a helicopter is undesirable since the onboard equipment need to undergo rigorous testing and certification, and the associated cabling needed for such high demands increases the weight of the equipment substantially. Furthermore, the operation of the flapper valve may create turbulent flow, causing the water to disperse laterally as it is dumped. In fire-fighting, lateral dispersal may be undesirable as the water may be more susceptible to evaporation before reaching the ground and also because some of the water may overshoot the desired target. With the butterfly valves, they tend to cause lateral dispersal when operated as a metering valve and may be difficult to seal as one plate may be located inside the bucket and the other plate may be located outside the bucket.

To address some of the shortcomings of flapper valves and butterfly valves, U.S. Pat. No. 6,192,990 to Brooke discloses a multi-dump metering valve having an outer assembly and an inner assembly in which the outer assembly is moveable between open and closed positions, and the outer assembly has a reduced surface area on those surfaces which are disposed normally to a direction of movement. The outer assembly is thereby adapted to be less affected by hydrostatic and hydrodynamic forces directed so as to oppose its movement. U.S. Pat. No. 6,192,990 is in its entirety incorporated herein by reference. While the subject matter disclosed in Brooke is an improvement over the prior art, nevertheless, it would be desirable to even further reduce the surface area on those surfaces which are disposed normally to a direction of movement so as to be even less affected by hydrostatic and hydrodynamic forces directed so as to oppose its movement. With an even further reduced surface area, the force required to actuate the valve would be considerably less with the advantage that the actuating hardware may be reduced to achieve considerable weight reduction and that motors with a reduced power demand may be used with the advantage of a reduced electric power demand. In addition, it would be desirable for the valve apparatus to be more easily serviceable so that the seals in the apparatus are more easily replaced when worn or damaged.

SUMMARY OF THE INVENTION

In one aspect, the invention provides an improved multi dump metering valve over the valve in Brooke, having an even further reduced surface area on those surfaces which are disposed normally to a direction of movement so as to be even less affected by hydrostatic and hydrodynamic forces directed so as to oppose its movement. This may be achieved in part by improved annular seal members that present a reduced surface area disposed normally to a direction of movement, and in part by obviating the need for the spacer arms and the guide post of the Brooke apparatus. As a result of the reduced surface area, the load required to actuate the valve to the open position is significantly reduced from that of the Brooke apparatus. In addition, the outer assembly of the valve in the present invention is biased toward the open position of the valve, which further reduces the load required to open the valve. For example, the load on the actuator cable in the Brooke apparatus is approximately 250 lbs., whereas the load to open the valve of the present invention, for a comparably sized valve, is approximately 50 lbs. As a result, a much smaller actuator motor and associated actuator hardware are needed to open and close the valve of the present invention, with the significant advantage that the actuator motor and actuator hardware may be housed on the valve assembly itself rather than being housed in a separate and bulky control head. This advantage greatly simplifies the control hardware and obviates the need for a bulky control head, which may be replaced with a simple and significantly lighter cargo hook mechanism for use with the present invention. A weight reduction of approximately 50% may be achieved by the reduced hardware required, and this is significant for ground personnel who are tasked with manipulating the bucket and control mechanism during fire fighting operations.

The advantage of being able to use a significantly smaller motor in the present invention translates to a significantly lower power demand on the electrical system of the aircraft. For example, the electrical load required for the present invention has been reduced to approximately 5 amps, from the approximately 25 amps required by the Brooke apparatus. This reduced electrical load means that the controller may be much smaller and may be housed directly on the bucket rather than in the helicopter, which means that the equipment need not go through the aircraft certification process that would otherwise be required in order for it to be onboard the aircraft. This results in a significant cost reduction to the manufacture as well as the aircraft operator.

In another aspect, the present invention provides a more serviceable valve than that of the Brooke apparatus. A significant wear point has been found to be the seals, and the configuration of the present invention in conjunction with the annular seal members of the present invention make it easier and faster to service than the Brooke apparatus.

Accordingly, in some aspects the present invention provides an improved valve for aerial firefighting buckets, the valve comprises an inner assembly comprising a base plate spaced apart from a top plate, the base plate and the top plate defining therebetween an open side portion of the inner assembly, the base plate defining an outlet; an outer assembly comprising solid side walls, the outer assembly being movable with respect to the inner assembly between an open position and a closed position, an upper portion of the solid side walls being adapted to sealably cooperate with the top plate only when the outer assembly is in the closed position, a lower portion of the solid side walls being adapted to sealably cooperate with the base plate only when the outer assembly is in the closed position, wherein in the open position flow through the valve is permitted through the open side portion and the outlet of the outer assembly, and in the closed position flow through the valve is prevented by sealing engagement between the solid side walls of the outer assembly and the top plate and by engagement between the solid side walls and the base plate of the inner assembly; and an electrical actuator mounted to the inner assembly and connected to the outer assembly and being operable to move the outer assembly between the open position and the closed position in response to electrical control signals; and an electrical conduit connected to the electrical actuator to conduct electrical control signals from a control input device to the actuator.

In some embodiments, a lifting member is provided connected to the side walls of the outer assembly and disposed across an interior diameter of the side walls, and an actuator cable is provided connected to the lifting member and the electrical actuator for moving the outer assembly between the open and the closed positions.

In some embodiments, the electrical actuator comprises a motor having an output shaft and a drum connected to the shaft, the drum being adapted to receive a portion of the cable and operable to drive the cable to impart motion to the outer assembly. In some embodiments, one or more sheaves are connected to the inner assembly wherein the cable defines a closed loop as it runs around the drum and the one or more sheaves, and wherein the lifting member is connected to a point on the cable such that rotation of the cable in one direction causes the outer assembly to move towards the open position, and rotation of the cable in the opposite direction causes the outer assembly to move towards the closed position.

In some embodiments, a biasing means is provided cooperating with the outer assembly and the inner assembly to exert a force urging the outer assembly into the open position. The biasing means may comprise a tension spring connecting the outer assembly and the inner assembly.

In some embodiments, a position sensor is mounted on the drum wherein the position sensor provides feedback to an operator as to the position of the drum which can be correlated to a position of the outer assembly in relation to the inner assembly thereby assisting the operator to partially open the valve.

In some embodiments, the lower portion of the solid side walls is provided with an elastomeric extrusion fitted to the lower edge and extending around its periphery to define a lower seal, the extrusion having a flexible flange portion extending outward of the side walls to adapt them to sealably cooperate with the base plate, the flange portion of the lower seal being positioned to sealably engage the base plate when the outer assembly is in the closed position. As well, the upper edge of the side walls may be provided with a removable upper annular gasket and a removable annular retainer that is adapted to retain the upper annular gasket to the upper edge in a manner that a portion of the annular gasket extends inward on an inner portion of the side walls to adapt them to sealably cooperate with the top plate, the upper annular gasket being positioned to sealably engage the top plate when the outer assembly is in the closed position.

Other advantages of the present invention will be apparent to those skilled in the art. The following detailed disclosure and drawings disclose several embodiments of the invention, which is capable of expression in structures other than those particularly described and illustrated.

DESCRIPTION OF THE DRAWINGS

FIG. 3 is a section of the front elevation of the valve of FIG. 2 in a fully opened position;

FIG. 4 is a close section view of an annular seal shown in FIG. 3;

FIG. 5 is a section of the front elevation of the valve of FIG. 2 in a fully closed position;

FIG. 6 is a simplified top plan view of the valve of FIG. 1;

DETAILED DESCRIPTION

Figure 1:
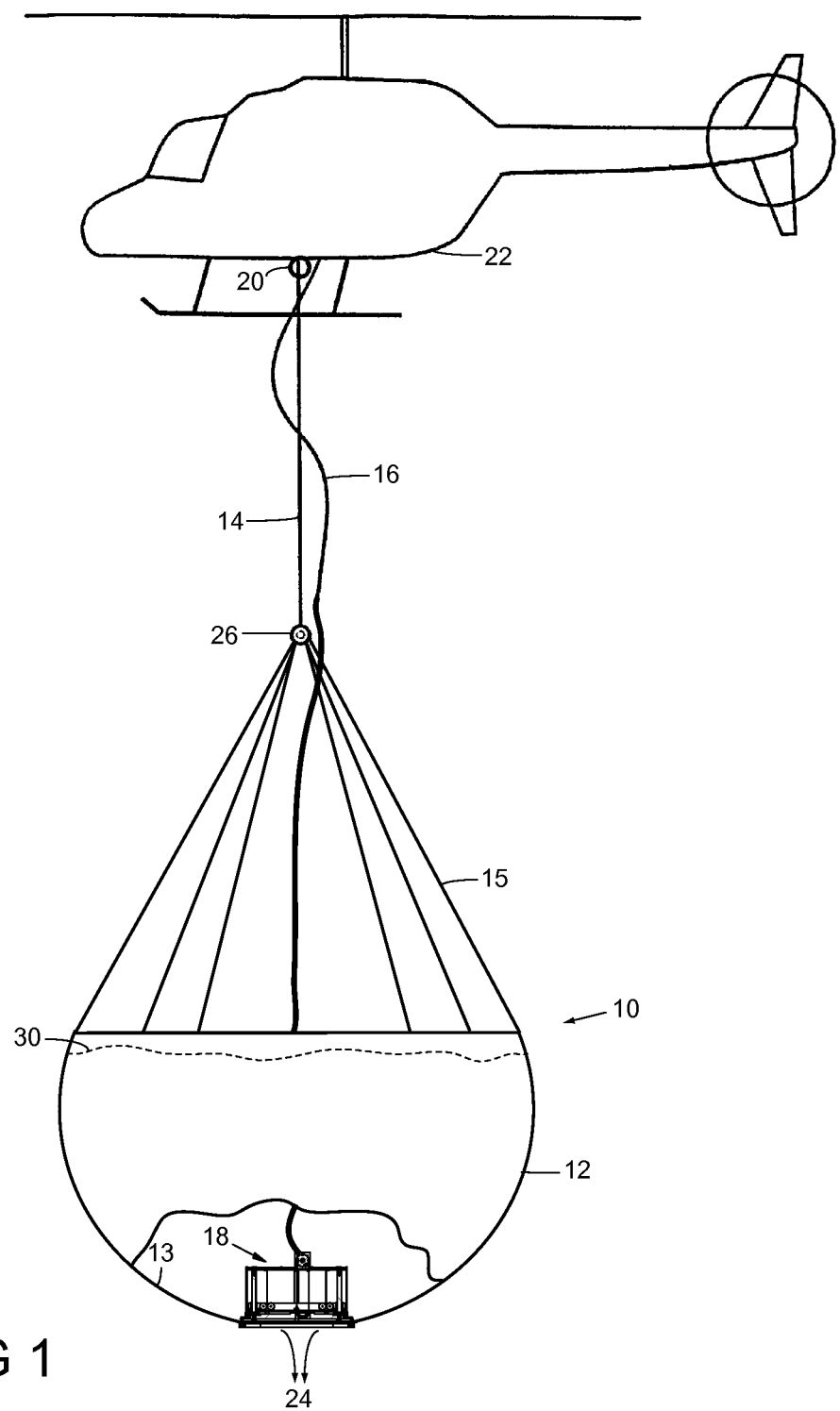
FIG. 1 is a side view of a fire-fighting bucket suspended from a helicopter and shown with a portion cutaway to reveal a valve according to one aspect of the invention.
Figure 2:
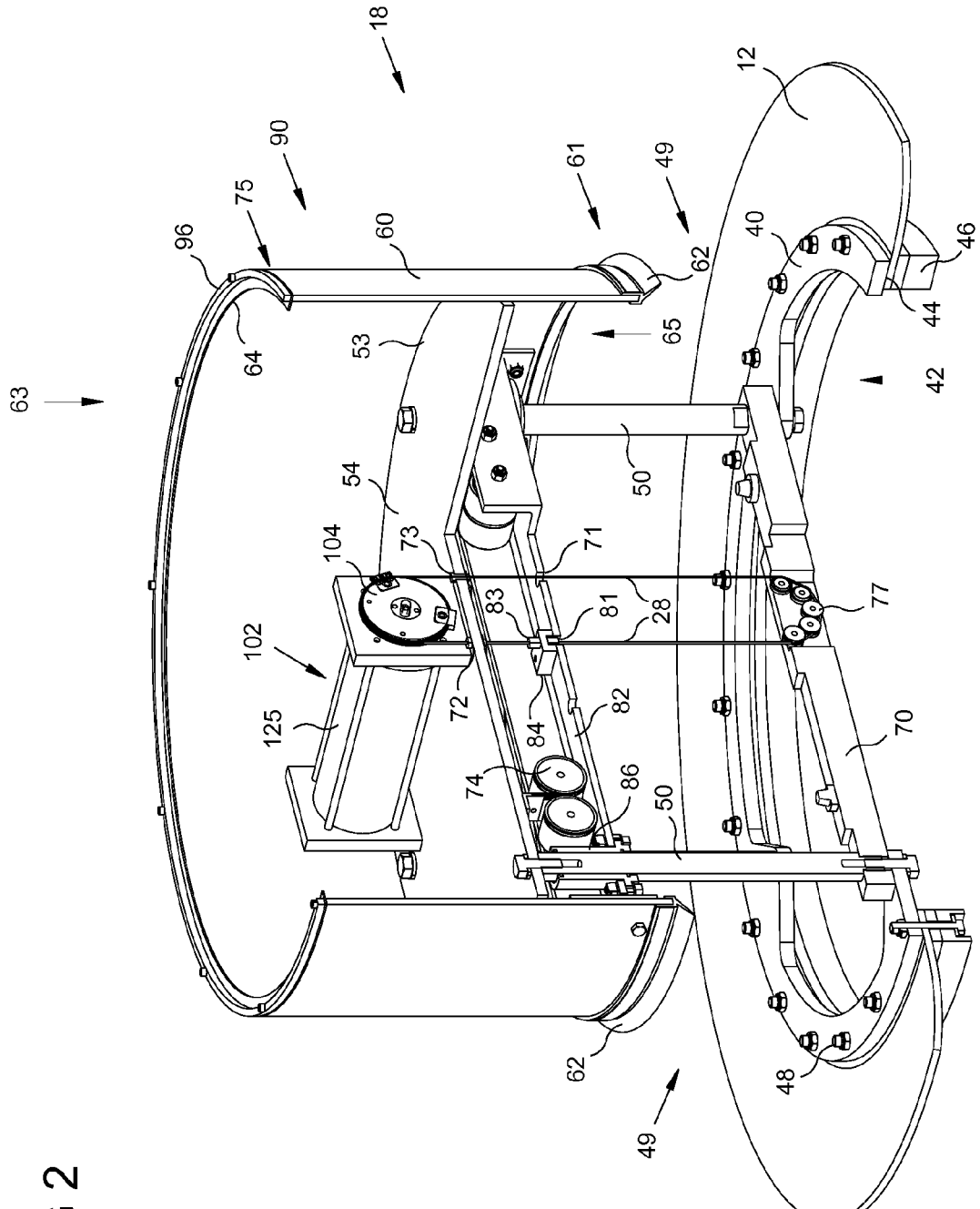
FIG. 2 is a section in perspective view of the valve of FIG. 1, in an open position.
Figure 7:
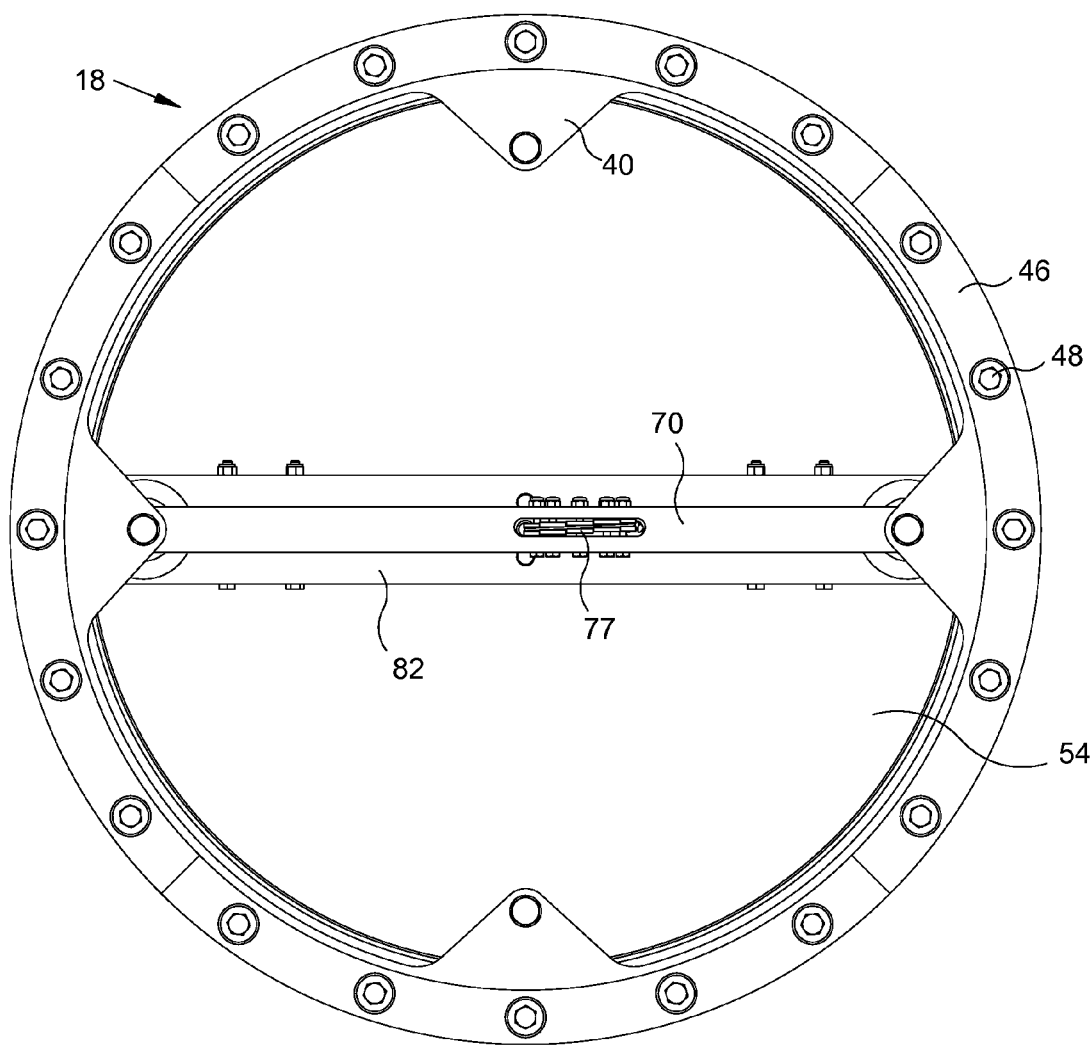
FIG. 7 is a simplified bottom plan view of the valve of FIG. 1.

Referring to FIG. 1, a fire-fighting bucket is shown generally as 10. The bucket 10 may include a reservoir 12 for containing a volume of fluid 30. The reservoir 12 may include a bottom interior surface 13 having a valve 18 in accordance with an embodiment of the present invention thereon for controllably releasing a stream 24 of fluid over a fire, for example. The reservoir 12 may be suspended from a suspension mechanism 26 by support cables 15 and the suspension mechanism 26 may be suspended from cargo hook 20 of helicopter 22 by support cable 14. A control cable 16 may be connected between the helicopter 22 and the valve 18 to transmit instructions from a controller to the valve. The control cable 16 may be an electrical cable, for example.

Referring to FIGS. 2-7, valve 18 may have a flat circular base plate 40 having a central circular outlet 42 extending therethrough. A bottom portion 44 of the base plate 40 defines a seat to receive an edge portion of the reservoir 12. An annular clamping member 46 may be fastened to the bottom portion 44 by a plurality of bolts 48, clamping the received edge of the reservoir 12 therebetween to create a substantially waterproof seal between the valve and the reservoir.

A plurality of guide rods or support members 50 may extend rigidly and perpendicularly from an interior surface of the base plate 40. A top plate 54, which in one embodiment of the invention defines a circular perimeter, may be rigidly connected to distal ends of the support members 50 so as to be substantially parallel to the base plate 40, thereby defining an open-sided cylinder therewith. A cross member 70 spans an interior diameter of central circular outlet 42 between two diametrically opposed support members 50.

Base plate 40 and top plate 54 may together define an inner assembly 100 of the valve 18, which may further include support members 50 and cross member 70.

An outer assembly 90 comprises solid side walls 60 having first and second open ends 63 and 65. Side walls 60 may be cylindrical and may be disposed substantially concentrically about top plate 54. The outer assembly 90 is movable with respect to the inner assembly 100 between an open position shown in FIGS. 2-3, and a closed position shown in FIG. 5. An upper portion 75 of solid side walls 60 may be adapted to sealably cooperate with top plate 54 only when outer assembly 90 is in the closed position (FIG. 5). A lower portion 61 of solid side walls 60 may be adapted to sealably cooperate with base plate 40 only when the outer assembly is in the closed position. In the open position (FIG. 3) flow through valve 18 is permitted through open side portions 49 and outlet 42 of inner assembly 100. In the closed position (FIG. 5) fluid flow through valve 18 is prevented by sealing engagement between solid side walls 60 of outer assembly 90 and top plate 54 and base plate 40 of inner assembly 100.

To adapt lower portion 61 of side walls 60 to sealably cooperate with base plate 40, a lower annular seal member 62 may be disposed around an outer perimeter of the lower portion 61 of side walls 60. The annular seal member 62 may comprise of a linear elastomeric extrusion 91 (shown in cross section in FIG. 4) having a U-shaped body portion 93 that is adapted to closely fit around the edge of the lower portion 61 of the side walls 60, and a flexible flange portion 95 extending downward and outward from the U-shaped body portion 93. The extrusion 91 may be slid onto the entire bottom edge of the side walls 60 such that the flange portion 95 extends outward and downward from the bottom portion 61, thereby providing an annular seal member 62. The extrusion 91 may be secured to the bottom edge by various means, such as for example by a cylindrical clamp band that wraps around a portion of the extrusion and tightens it to the outside wall of the side walls 60 (similar to a large hose clamp).

Engagement between lower annular seal member 62 and top surface of base plate 40 (particularly between the flange portion 95 and the top surface) provides a substantially waterproof seal between the side walls 60 and base plate 40 when the valve is closed.

To adapt upper portion 75 of side walls 60 to sealably cooperate with top plate 54, upper annular seal member 64 may be disposed around an inner perimeter of the upper portion 75 of side walls 60. Engagement between upper annular seal member 64 and top plate 54 provides a substantially waterproof seal between side walls 60 and top plate 54 when the valve is closed (FIG. 5). The upper annular seal member 64 may comprise a ring of elastomeric material such as an annular gasket having an external circumference the same or nearly the same as the external circumference of the side walls 60, and an internal circumference that is less than the internal circumference of the side walls 60 such that a portion of the annular gasket extends inward of the side walls 60. The gasket may be secured to the top edge of the side walls 60 by various means, such as for example, by a removable annular retainer such as fastening ring 96 adapted to be screwed to the top edge. Alternatively, the upper annular seal member may comprise of a linear extrusion similar to the lower annular seal member except that the flange portion of the extrusion would extend downward and inward from the top edge of upper portion 75 so that it engages the top surface of the top plate 54 when the valve 18 is closed (FIG. 5). The distance between first and second annular seal members 62 and 64 may be selected to be substantially equal to the distance between base plate 40 and top plate 54 to permit both annular seal members to form respective seals substantially simultaneously when valve 18 is closed. In some embodiments, annular seal members 62 and 64 do not bear on any surface when valve 18 is opened, so that wear on annular seal members 62 and 64 is reduced.

Valve control member 82, which functions as a lift bar, may be disposed across an interior diameter of the side walls 60, connected to interior faces of side walls 60, preferably at the lower portion 61 of side walls 60. Valve control member 82 may define a plurality of openings therethrough having guide bushings 86 therein. Guide bushings 86 may be disposed coaxially about respective support members 50 and slidably connected thereto. A cable mount or cable connection 84 may be disposed on valve control member 82. In a cylindrical embodiment of valve 18, cable connection 84 may be at a centre-point on valve control member 82 and may be concentric with cylindrical side walls 60.

The cable connection 84 may comprise a hole 81 through the valve control member 82 and a cable clasping member 83 aligned with the hole 81 and adapted to being secured to a drive cable 28 that is threaded through hole 81. Another hole 71 may be provided through the valve control member 82 a distance away from hole 81. The top plate 54 may be provided with hole 72 and hole 73 that are coaxial with the hole 81 and hole 71, respectively, on the valve control member 82. The cross member 70 may be provided with a plurality of sheaves 77 arranged in a semicircular configuration for guiding a continuous drive cable 28. Mounted on the top plate 54 may be provided with a water resistant actuator assembly 102 having a rotatable cable drum 104 on which the drive cable 28 is partially spooled and which has a diameter and is positioned such that drive cable 28 passes through holes 72 and 73 unimpeded. The continuous drive cable 28 further passes through holes 81 and 71, and around sheaves 77, and is secured to cable connection 84. Accordingly, rotation of the cable drum 104 by actuator assembly 102 results in the opening and closing of the valve 18.

The inner assembly 100 may be connected to the outer assembly 90 by constant force tension springs 74 that may be connected to the top plate 54. The tension springs 74 exert a force urging the outer assembly into the open position and thereby assist in opening the valve when the reservoir 12 contains fluid by countering some of the hydrostatic and hydrodynamic pressure. It will be appreciated that alternative biasing means may be provided to urge the outer assembly into the open position with respect to the inner assembly, such as a variety of resilient members or springs connecting the outer assembly and the inner assembly.

The side walls 60, the annular seal members 62 and 64, and the valve control member 82 comprise the outer assembly 90 of the valve apparatus.

Referring to FIG. 5, the valve 18 is shown in a closed position, such that the lower portion 61 of side wall 60 is adjacent the base plate 40 and the upper portion 75 of the side wall is adjacent the top plate 54. In this position, lower annular seal member 62 may be held in close contact with the top of the base plate 40 to form a substantially fluid-tight seal therewith about the whole of the outside perimeter of lower portion 61. Similarly, upper annular seal member 64 may be held in close contact with the outer surface 53 of top plate 54 to form a substantially fluid-tight seal therewith about the whole of the inside perimeter of upper portion 75 of side wall 60.

Figure 8:
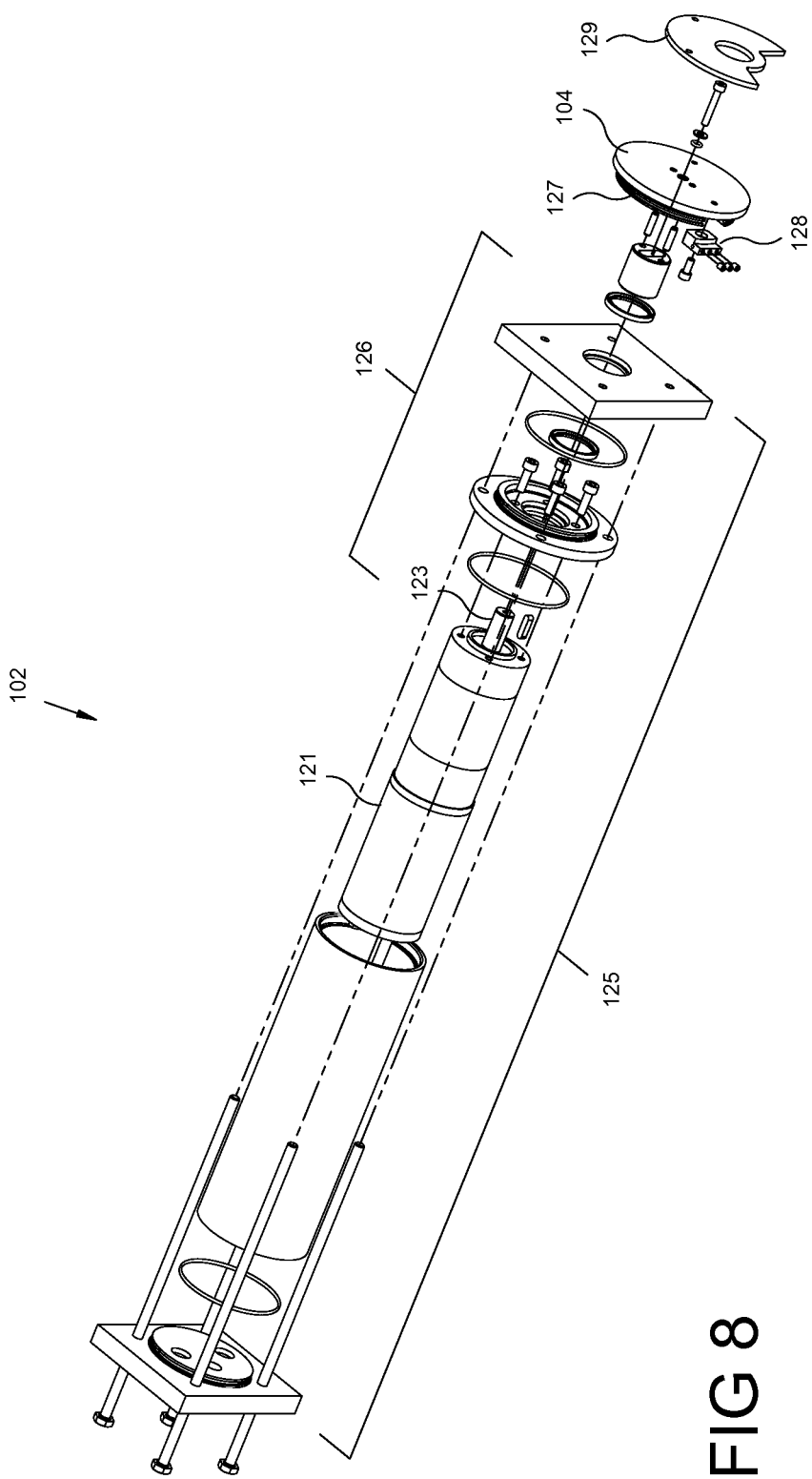
FIG. 8 is an exploded view of the actuator assembly of the valve in FIG. 1.

Referring to FIG. 8, the actuator assembly 102 is shown generally in an exploded view. The actuator assembly may include a DC electric motor and gearbox 121 connected to an output shaft 123 that is connected to and rotates the cable drum 104. The motor and gearbox 121 is housed in a watertight housing assembly 125 which keeps the motor and gearbox 121 dry. The watertight housing assembly 125 includes a watertight seal assembly 126 through which the output shaft 123 passes. One or more electric conduits 118 that supply electricity to the motor from a remote power source (not shown) may be provided and such conduits may be electrically connected to a control input device such as a motor control unit or controller (not shown) by which the actuation of the motor 121 (hence the cable drum 104) may be controlled by an operator. The controller may be a programmable logic controller (PLC).

The cable drum 104 may include two parallel grooves 127 adapted to receive two spools of the drive cable 28, and a cable anchor 128 that secures one portion of the drive cable 28 to the cable drum 104. Having two spools of the drive cable 28 on the cable drum 104 allows for a cable drum 104 having a smaller diameter than would be otherwise required to drive the drive cable 28 the distance required to open and close the valve 18, and this means that a smaller motor can be used to drive the cable drum, thereby decreasing the electrical load required to operate the valve. The cable drum also includes a position sensor mechanism that provides position information of the cable drum and/or signals the extreme ends of travel of the drive cable—one end when the valve is fully open and one end when the valve is fully closed. The position information provided may be used to control the motor. As illustrated, the position sensor mechanism may include a sensor cam 129 that rotates with the cable drum 104 and interacts with stationary sensors 117 (FIG. 6) that are electrically connected to a controller via wires 119. Other position sensor devices and configurations may be used.

In operation, a helicopter may carry a reservoir containing volume of water 30 to the site of a fire, the volume of water being retained in the reservoir by valve 18 which may be maintained in a closed position to prevent water from reaching outlet 42. When the valve is in a closed position, the top plate 54, the base plate 40 and the side walls 60 may define a closed-sided cylindrical chamber 57 which may be in communication with the surrounding environment through outlet 42, but which is separated from the reservoir by fluid-tight seals. The reservoir 12 may be open at the top such that when the reservoir contains water, hydrostatic pressure in the reservoir is greater than atmospheric pressure by an amount equal to the head of water in the reservoir. The cylindrical chamber 57 may be in communication with the atmosphere through outlet 42 and therefore may be at atmospheric pressure. Therefore, the pressure in the reservoir may be higher than the pressure in cylindrical chamber 57 and may tend to urge annular seal members 62 and 64 into respective surfaces between the outer and inner assemblies 90 and 100 of the valve, creating improved waterproof seals therebetween.

A signal may be sent from the helicopter 22 via cable 16 to the controller to instruct the controller to open valve 18. The signal, which may include DC electrical power, may be sent to control DC motor 121 to produce rotary motion of output shaft 123 which rotates the cable drum 104 in direction 130, which imparts upward linear movement of the valve control member 82 causing the outer assembly 90 to be separated from the inner assembly 100. In one embodiment of the invention, the cable drum 104 describes a circle having a diameter of approximately 3 inches so as to permit a maximum linear travel of the drive cable 28 at the cable connection 84 of approximately 9.4 inches. In other embodiments, these may vary depending on the specific requirements of the valve.

The positional sensors may be located to detect predetermined positions of the cable drum 104. For example, a sensor may be located to detect when the cable drum is at the point where the valve is fully closed; a sensor may be positioned to detect when the cable drum is at the point where the valve is fully open; and sensors may be positioned to detect when the cable drum is at positions therebetween. This positional information may be used as feedback by the controller to control the rotation of DC motor 121 and may be transmitted to the helicopter 22 along control cable 16 to provide such positional information to the operator. The operator may also use the positional information provided by the positional sensors to control the DC motor 121 so as to stop the outer assembly 90 at a position intermediate fully closed and fully opened positions, whereby the valve 18 may be controlled to permit a reduced or partial flow of fluid from the reservoir.

The valve may be designed to reduce forces which oppose movement of the outer assembly. For example, the outer assembly 90 may be slideably mounted on support members 50 and guided by bushings 86 such that the outer assembly 90 may slide under the influence of the actuator cable without undue friction or racking. The surface area described by the upper edge of the side walls 60 and the annular seal members 62 and 64 are preferably the only parts of the outer assembly 90 which may be disposed generally perpendicularly to the direction of travel of the outer assembly 90. Therefore, hydrostatic and hydrodynamic forces acting on the surfaces of these portions may be the only hydrostatic and hydrodynamic forces tending to resist the movement of the outer assembly 90. Accordingly, a substantially reduced surface area is achieved in the present invention as compared to the valves of the prior art such that hydrostatic and hydrodynamic forces thereon will be correspondingly reduced. An increase in the size of the outlet 42 and a corresponding increase in the size of the valve may produce a relatively small increase in the surface areas of upper edge of the side walls 60 and the annular seal members 62 and 64. Because the hydrostatic and hydrodynamic forces resisting movement of the outer assembly may be relatively small, the DC motor 121 may therefore be relatively small, permitting a reduction in weight and power requirements.

In one embodiment, the valve 18 may be substantially symmetrical about a vertically extending central axis 150 extending through the centre of outlet 42 such that water may flow transversely towards the outlet 42 from all directions equally. Therefore, the transverse or horizontal components of respective flows may substantially cancel one another, reducing turbulence and producing an output stream 24 which may be substantially coherent and vertically directed. Turbulence may be further reduced due to the fact that in an open or partially open position, there may be few obstructions to block water flow. The support members 50 may have relatively small cross-sections and correspondingly small surface areas. Additionally, the support members may have rounded profiles to reduce turbulence.

At any time, a signal may be sent from the helicopter 22 to the controller via cable 16 to instruct the controller to close valve 18. The controller may close the valve by reversing the polarity of the DC power thereby reversing the direction of rotation of DC motor 121, hence output shaft 123 and the cable drum 104 in direction 132, which imparts downward linear movement of the valve control member 82 causing the outer assembly 90 to be drawn toward the inner assembly 100 until the valve 18 closes. Hydrostatic and hydrodynamic forces acting to resist movement of the outer assembly 90 may be minimal, being mostly directed normally to the direction of travel, such normal forces being cancelled by equal and oppositely directed normal forces due to the substantially symmetrical design of the valve. By closing the valve 18 before the reservoir is empty, the operator may use the apparatus to perform controlled partial dumps whereby only a portion of the total volume of water 30 is dropped in a location, the remained being used elsewhere. By partially closing the valve 18, the operator may control the valve to permit reduced fluid flows, as required.

The operator may control the valve 18 to permit the apparatus to be refilled at a lake or river, for example, by opening the valve 18 of the now empty reservoir and lowering the reservoir into the lake. The bucket will tend to sink under its own weight and will thereby force water into the reservoir. When the reservoir is sufficiently full, the operator may signal the controller to close the valve, thereby sealing the water into the reservoir. The helicopter may then lift the apparatus out of the lake and repeat the dump/fill cycle as needed. When fully immersed, water will fill both the reservoir 12 and the cylindrical chamber 57 such that forces on the outer assembly 90 may be balanced. As the apparatus is lifted clear of the lake, the fluid in chamber 57 will drain out through outlet 42, creating an unbalanced hydrostatic force on the outer assembly 90 which may tend to further seal the outer assembly to the inner assembly.

While a specific embodiment and application of the invention has been disclosed, the invention encompasses many alternative embodiments and applications. For example, while an embodiment of valve 18 is cylindrical in shape, other shapes may be used. The valve may be made of metal plate welded into a cube or prism, for example. In such a valve, the base plate 40 and top plate 54 may define square plates separated by support members 50 to define an open-sided cube, for example. The side walls 60 of such a valve may be in an open ended box configuration. The valve may be further modified by making the base plate 40 funnel-shaped or in the shape of an inverted pyramid, for example. Alternative shapes may be useful to adapt the valve of the invention for alternative uses, such as for regulating the flow of particulate solids in railway hopper cars or agricultural hoppers, for example. The tension springs and actuator cable may be replaced with a hydraulic or pneumatic cylinder where an appropriate hydraulic or pressurized air supply is available. Support members 50 may be extended beyond top plate 54 to act as guide rods for the outer assembly 90. Alternatively, a plurality of U-channel tracks may be disposed to extend between top and base plates 54 and 40 respectively, and complementary guide rollers attached to an inner surface of side walls 60 such that the guide rollers may act as a roller bearing to facilitate the movement of the outer portion 90 with respect to the inner portion 100 while the U-channel tracks may provide alignment and prevent racking. Further mechanical equivalents will be apparent in which elements of the valve are replaced by parts that perform substantially the same function in substantially the same way to achieve substantially the same result, and such equivalents are within the scope of the present invention.

What is claimed is:

1. A valve comprising:
   a. an inner assembly comprising a base plate spaced apart from a top plate, the base plate and the top plate defining therebetween an open side portion of the inner assembly, the base plate defining an outlet, and the inner assembly further including at least one sheave;
   b. an outer assembly comprising solid side walls, the outer assembly being movable with respect to the inner assembly between an open position and a closed position, an upper portion of the solid side walls being adapted to sealably cooperate with the top plate only when the outer assembly is in the closed position, a lower portion of the solid side walls being adapted to sealably cooperate with the base plate only when the outer assembly is in the closed position, wherein in the open position flow through the valve is permitted through the open side portion and the outlet of the outer assembly, and in the closed position flow through the valve is prevented by sealing engagement between the solid side walls of the outer assembly and the top plate and by engagement between the solid side walls and the base plate of the inner assembly;
   c. a lifting member connected to the outer assembly and disposed across an interior thereof;
   d. an electrical motor mounted to the inner assembly and having an output shaft and a drum connected to the shaft and being operable to rotate the drum in response to electrical control signals,
   e. a cable received on the drum and the at least one sheave and defining a closed loop as the cable runs around the drum and the at least one sheave, wherein the lifting member is connected to a point on the cable such that rotation of the cable in one direction causes the outer assembly to move towards the open position, and rotation of the cable in the opposite direction causes the outer assembly to move towards the closed position; and
   f. an electrical conduit connected to the motor to conduct electrical control signals from a control input device to the motor.

2. The valve of claim 1 further comprising biasing means cooperating with the outer assembly and the inner assembly to exert a force urging the outer assembly into the open position.

3. The valve of claim 2 wherein the biasing means comprises a tension spring connecting the outer assembly and the inner assembly.

4. The valve of claim 1 further comprising a position sensor mounted on the drum wherein the position sensor provides feedback to an operator as to the position of the drum which can be correlated to a position of the outer assembly in relation to the inner assembly thereby assisting the operator to partially open the valve.

5. The valve of claim 1 wherein the lower portion of the solid side walls is provided with an elastomeric extrusion fitted to the lower edge and extending around its periphery to define a lower seal, the extrusion having a flexible flange portion extending outward of the side walls to adapt the side walls to sealably cooperate with the base plate, the flange portion of the lower seal being positioned to sealably engage the base plate when the outer assembly is in the closed position.

6. The valve of claim 5 wherein the upper edge of the side walls is provided with a removable upper annular gasket and a removable annular retainer that is adapted to retain the upper annular gasket to the upper edge in a manner that a portion of the annular gasket extends inward on an inner portion of the side walls to adapt the side walls to sealably cooperate with the top plate, the upper annular gasket being positioned to sealably engage the top plate when the outer assembly is in the closed position.

7. The valve of claim 1, wherein a perimeter portion of the base plate is adapted to sealably engage a portion of a reservoir and the reservoir is adapted to house the valve.

* * * * *